US010671119B2

(12) United States Patent
Ohtaka et al.

(10) Patent No.: US 10,671,119 B2
(45) Date of Patent: Jun. 2, 2020

(54) PORTABLE TERMINAL, GRIP AND BATTERY COVER

(71) Applicant: CASIO COMPUTER CO., LTD., Tokyo (JP)

(72) Inventors: Masatoshi Ohtaka, Saitama (JP); Yasunori Chiba, Tokyo (JP); Manabu Ootake, Yamanashi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/880,270

(22) Filed: Jan. 25, 2018

(65) Prior Publication Data
US 2018/0217638 A1 Aug. 2, 2018

(30) Foreign Application Priority Data

Jan. 27, 2017 (JP) ................. 2017-012729

(51) Int. Cl.
G06F 1/16 (2006.01)
H01M 2/04 (2006.01)
H04M 1/02 (2006.01)
G06K 7/10 (2006.01)
H01M 2/10 (2006.01)

(52) U.S. Cl.
CPC .......... G06F 1/1637 (2013.01); G06F 1/1626 (2013.01); G06F 1/1635 (2013.01); G06F 1/1656 (2013.01); G06F 1/1662 (2013.01); G06K 7/10544 (2013.01); G06K 7/10881 (2013.01); H01M 2/0404 (2013.01); H01M 2/1066 (2013.01); H04M 1/0262 (2013.01); H04M 1/0281 (2013.01)

(58) Field of Classification Search
CPC .... G06F 1/1637; G06F 1/1662; G06F 1/1626; G06F 1/1656; G06F 1/1635; H01M 2/1066; H01M 2/0404; G06K 7/10544; G06K 7/10881; H04M 1/0281; H04M 1/0262
USPC ....................................... 361/679.4
See application file for complete search history.

(56) References Cited

U.S. PATENT DOCUMENTS 5,046,739 A * 9/1991 Reichow ................. A63F 13/02
273/148 B
5,831,819 A * 11/1998 Chacon ................. G06F 1/1626
361/679.56

(Continued)

FOREIGN PATENT DOCUMENTS

JP H10-112891 A 4/1998

Primary Examiner — Rockshana D Chowdhury
(74) Attorney, Agent, or Firm — Fitch, Even, Tabin & Flannery LLP

(57) ABSTRACT

A portable terminal elongated in a longitudinal direction and having a key operation section provided in a substantially lower area in the longitudinal direction of the front surface, in which a finger-hooking section that is a projection portion projecting in the thickness direction of the portable terminal is provided on a rear surface on the rear side of the key operation section, and has a first projection area that extends in the longitudinal direction and a second projection area that is located adjacent to the first projection area while extending toward a lower side in the longitudinal direction and is gradually widened in the lateral direction as extending toward the lower side in the longitudinal direction.

6 Claims, 16 Drawing Sheets

(56) References Cited

U.S. PATENT DOCUMENTS 6,407,911 B1 * 6/2002 Spence ................ G06F 1/1626
174/358
7,839,632 B2 * 11/2010 Matsui ............... G06K 7/10881
341/22

* cited by examiner

US 10,671,119 B2

PORTABLE TERMINAL, GRIP AND BATTERY COVER

CROSS-REFERENCE TO RELATED APPLICATION

This application is based upon and claims the benefit of priority from the prior Japanese Patent Application No. 2017-012729, filed Jan. 27, 2017, the entire contents of which are incorporated herein by reference.

BACKGROUND OF THE INVENTION

1. Field of the Invention

The present invention relates to a hand-held portable terminal, a grip, and a battery cover.

2. Description of the Related Art

For example, a hand-held portable terminal is known which has a structure where a device case has been formed to have a curved shape so as to be easily gripped and allow easy input operations, and a finger-hooking projection portion has been provided on the rear surface of the device case so that the device case is gripped by one hand with the index finger being hooked on this finger-hooking projection portion (for example, refer to Japanese Patent Application Laid-Open (Kokai) Publication No. 10-112891).

That is, this type of portable terminal is structured such that the thumb is put on an operation section provided on the front surface of the device case, and the index finger is hooked on the finger-hooking projection portion provided on the rear surface of the device case as if it is hooked on the trigger of a pistol, so that the operation section is operated with the thumb and a switch key provided on the finger-hooking projection portion is operated with the index finger with the device case being gripped by one hand.

However, this type of portable terminal has a problem in that, because the size of a hand using this terminal varies for each user, a user with small hands has difficulty in gripping the device case by one hand if the length of the device case in the width direction orthogonal to the longitudinal direction is long, and therefore cannot firmly grip the device case.

Also, there is another problem in this type of portable terminal in that the index finger is required to be hooked on the finger-hooking projection portion lightly so as to prevent its inadvertent operation on the switch key, and therefore a finger-hooking concave portion for allowing the middle finger to be hooked thereon is required to be provided near the finger-hooking projection portion so that the device case can be firmly held by one hand.

SUMMARY OF THE INVENTION

In accordance with one aspect of the present invention, there is provided a portable terminal comprising: an operation section which is provided in a substantially lower area in a longitudinal direction of a first surface of the portable terminal; and a projection section which is provided on a second surface on a rear side of the operation section and projects in a thickness direction of the portable terminal, wherein the projection section has a first projection area that extends in the longitudinal direction and a second projection area that is located adjacent to the first projection area while extending toward a lower side in the longitudinal direction and is gradually widened in a lateral direction as extending toward the lower side in the longitudinal direction, wherein the first projection area has a side surface which allows a user to exert force on the first projection area toward a holding hand side by each pulp of fingers of a holding hand excluding a thumb with each finger tip of the fingers touching the second surface when the user holds the portable terminal by gripping the portable terminal from sides of the operation section by one hand and putting the thumb on the operation section so as to operate the operation section with the thumb, and wherein the second projection area has a side surface on which the user can put an outer palm edge when the user holds the portable terminal by gripping the portable terminal from the sides of the operation section by one hand and putting the thumb on the operation section so as to operate the operation section with the thumb.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more clearly understood by the detailed description below being considered together with the following drawings.

FIG. 7A and FIG. 7B show the battery cover of the portable terminal shown in FIG. 5, of which FIG. 7A is a perspective view of the battery cover when viewed from a diagonally upper right side and FIG. 7B is a perspective view of the battery cover when viewed from a diagonally lower left side;

FIG. 8A, FIG. 8B and FIG. 8C show the battery cover of FIG. 7A and FIG. 7B, of which FIG. 8A is a rear view thereof, FIG. 8B is a left side view thereof, and FIG. 8C is a side view thereof when viewed from a lower side;

FIG. 12A, FIG. 12B and FIG. 12C show the battery cover of FIG. 9, of which FIG. 12A is a rear view thereof, FIG. 12B is a left side view thereof, and FIG. 12C is a side view thereof when viewed from a lower side;

FIG. 16A, FIG. 16B and FIG. 16C show the battery cover of FIG. 13, of which FIG. 16A is a rear view thereof, FIG.

DETAILED DESCRIPTION OF THE PREFERRED EMBODIMENTS

A. First Embodiment

Figure 1:
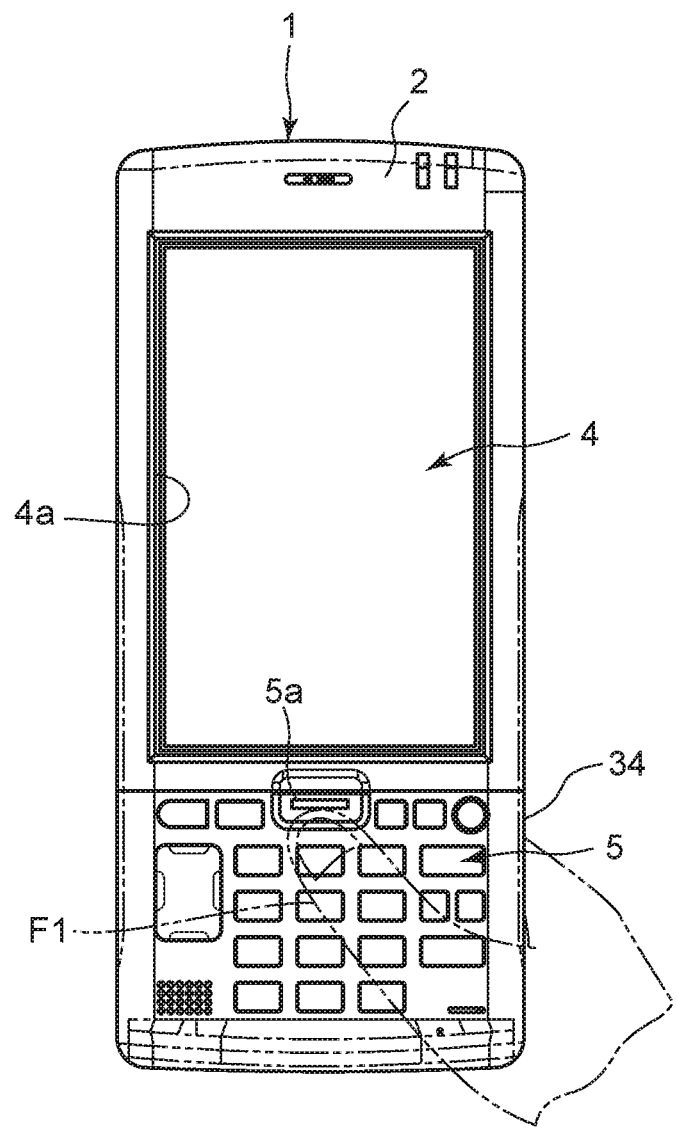
FIG. 1 is a front view of a first embodiment in which the present invention has been applied in a portable terminal.

A first embodiment where the present invention has been applied in a portable terminal will hereinafter be described with reference to FIG. 1 to FIG. 8C.

This portable terminal includes a device case 1, as shown in FIG. 1 to FIG. 5. This device case 1 is formed to have a rectangular shape elongated in a longitudinal direction (portrait orientation in FIG. 1), and has an upper case 2 and a lower case 3 into which modules (not shown) are incorporated.

The upper case 1 is structured such that its upper surface is formed to have a substantially rectangular flat plate shape, and side surface portions on its outer periphery are attached to the lower case 3, as shown in FIG. 1 and FIG. 3 to FIG. 5. In this embodiment, a display section 4 is provided in a substantially upper area on the upper surface of the upper case 2. For example, an upper side area occupying two-thirds of the upper surface of the upper case 2 has this display section 4. In a substantially lower area thereon, a key operation section 5 is provided. For example, a lower side area occupying one-third of the upper surface of the upper case 2 has this key operation section 5. As a result, this lower side area occupying one thirds of the device case 1 serves as a grip 34 for a user to hold the portable terminal 1 by one hand.

The display section 4 is a display panel of a flat-surface type, and is formed to have a substantially rectangular shape, as shown in FIG. 1. This display section 4 is structured to be arranged in the upper case 2 so as to correspond to a display window section 4a provided in the upper case 2, whereby displayed information can be viewed from above the upper case 2. The key operation section 5 includes various keys required for the portable terminal, such as numeric keys, a cursor key, and function keys. In this embodiment, the key operation section 5 has a trigger key 5a arranged on its upper middle area.

Figure 2:
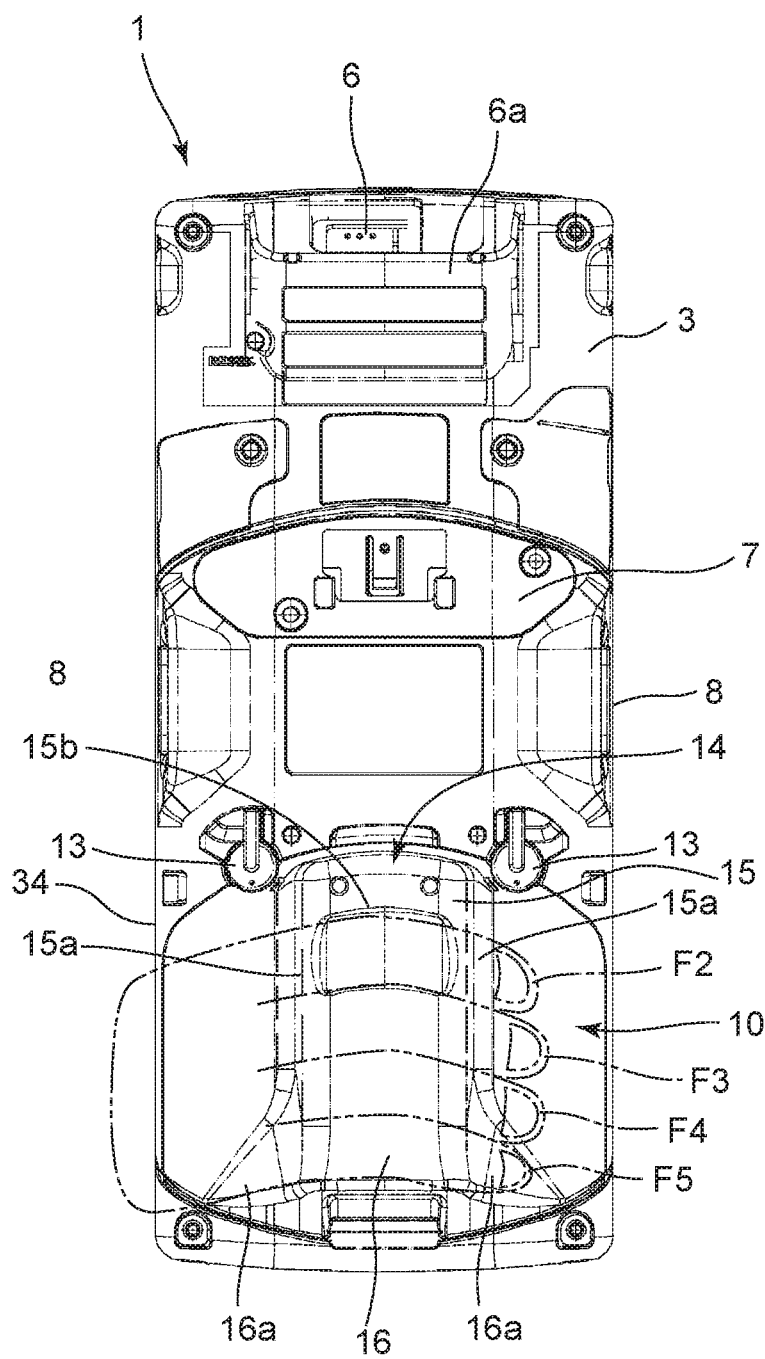
FIG. 2 is a rear view of the portable terminal shown in FIG. 1.

The lower case 3 is structured such that its rear surface is formed to have a substantially flat shape, its side surface portions in the lateral direction orthogonal to the longitudinal direction (lengthwise direction in FIG. 2) are formed to be curved toward the rear surface (lower surface in FIG. 4) so as to have an arc shape, and the side surface portions of the upper case 2 are attached to upper portions (upper portions in FIG. 4) of these side surface portions, as shown in FIG. 2 to FIG. 5. The upper rear surface of this lower case 3 is provided with a read window section 6 of an optical reading section (not shown), as shown in FIG. 2.

Figure 3:
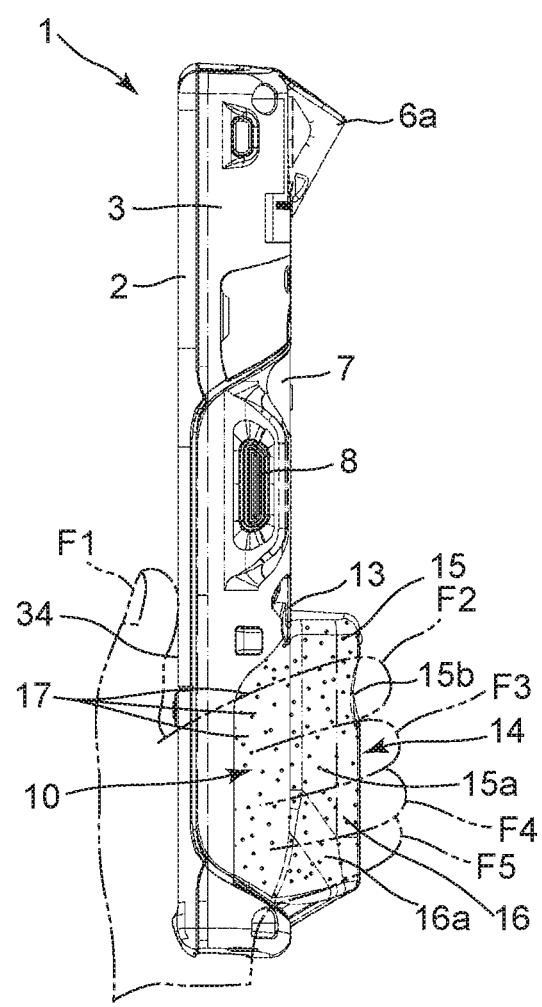
FIG. 3 is a side view of the portable terminal of FIG. 2 when viewed from a left side.
Figure 4:
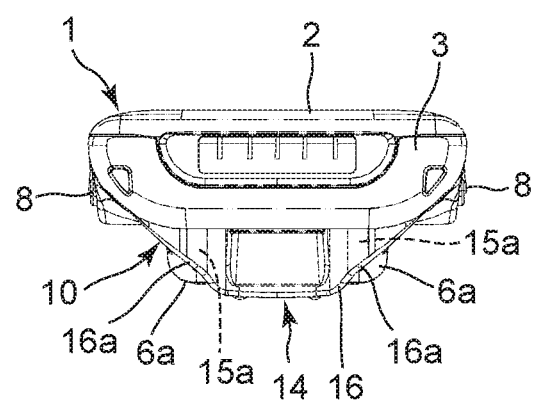
FIG. 4 is a side view of the portable terminal of FIG. 1 when viewed from a lower side.
Figure 5:
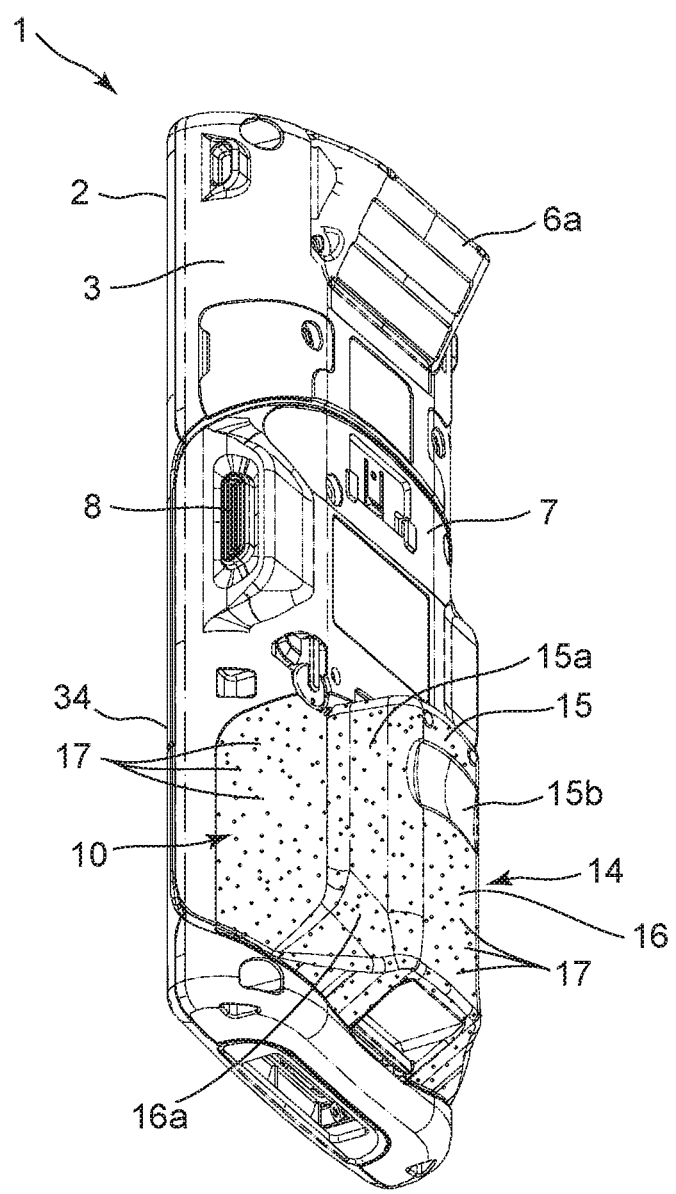
FIG. 5 is a perspective view of the portable terminal of FIG. 2 when viewed from a diagonally lower left side.

In this embodiment, on the upper rear surface of the lower case 3, a read projection section 6a projecting in a V shape is provided, as shown in FIG. 3 and FIG. 5. The read window section 6 is provided in a tilted surface of this read projection section 6a located on its upper side. The optical reading section emits a laser beam from the read window section 6 of the lower case 3 to the outside of the device case 1, and receives a reflected light of the laser beam so as to read, for example, a barcode of an article.

Also, to substantially the midpoint of this lower case 3 in the longitudinal direction (portrait orientation in FIG. 2), a connection cover 7 which openably covers an external connecting section (not shown) is attached, as shown in FIG. 2 and FIG. 5. Moreover, on both side portions of the lower case 3 at substantially the midpoint of the lower case 3 in the longitudinal direction, trigger keys 8 are provided.

Figure 6:
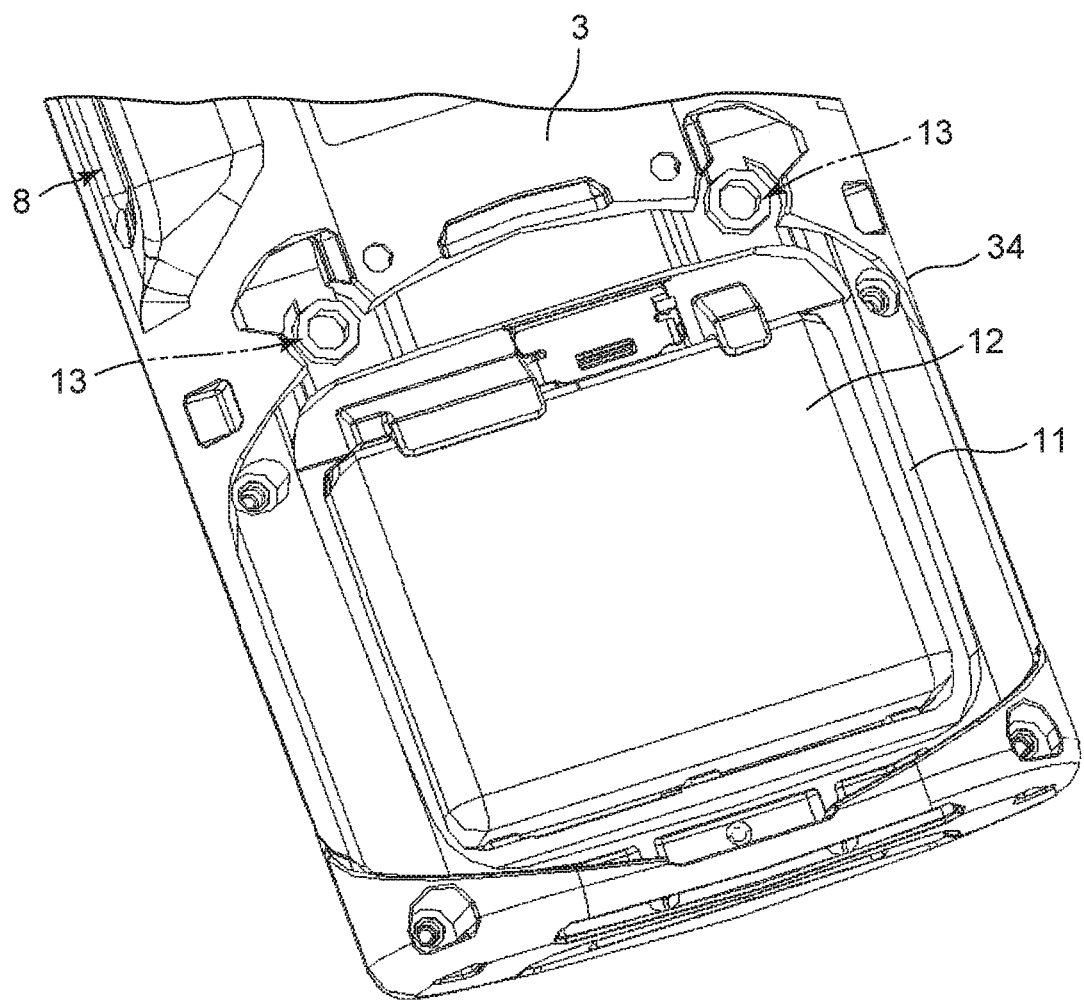
FIG. 6 is an enlarged perspective view of the main section, in which a battery cover has been removed from the portable terminal shown in FIG. 2.
Figure 7A:
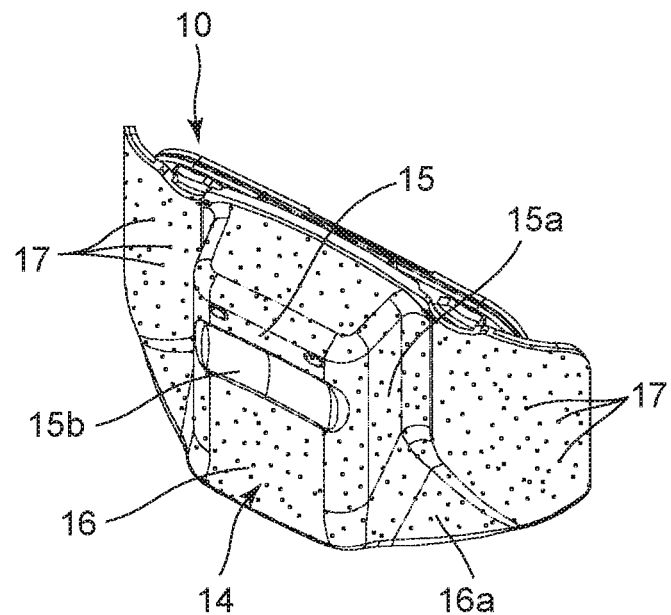
Figure 7B:
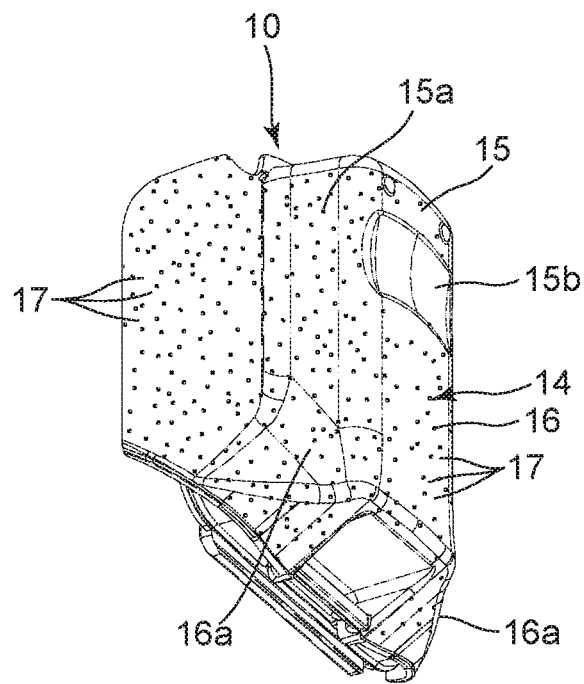
Figure 8A:
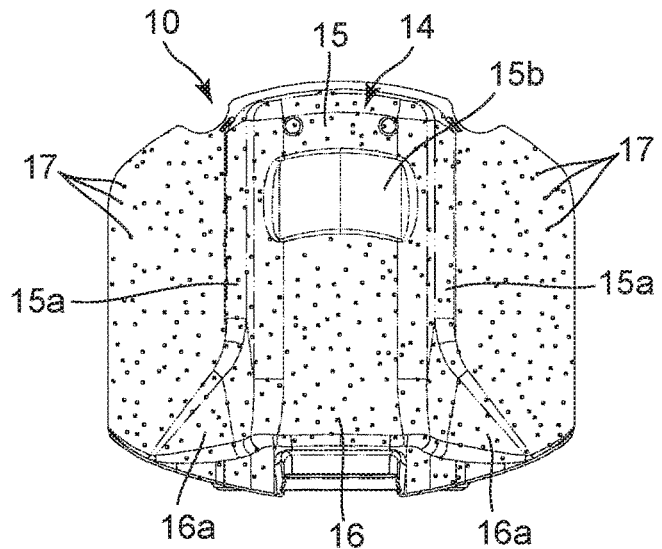
Figure 8B:
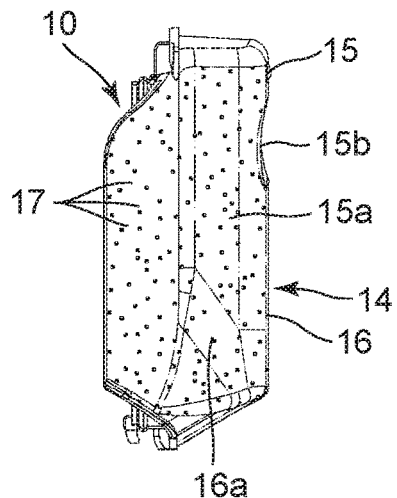
Figure 8C:
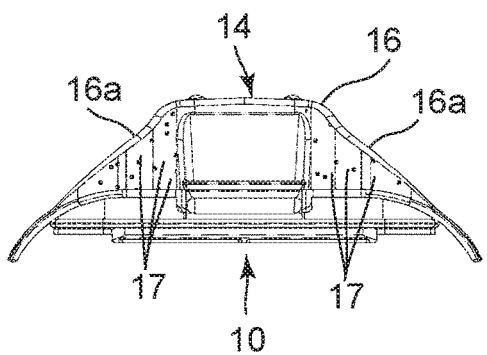
Figure 9:
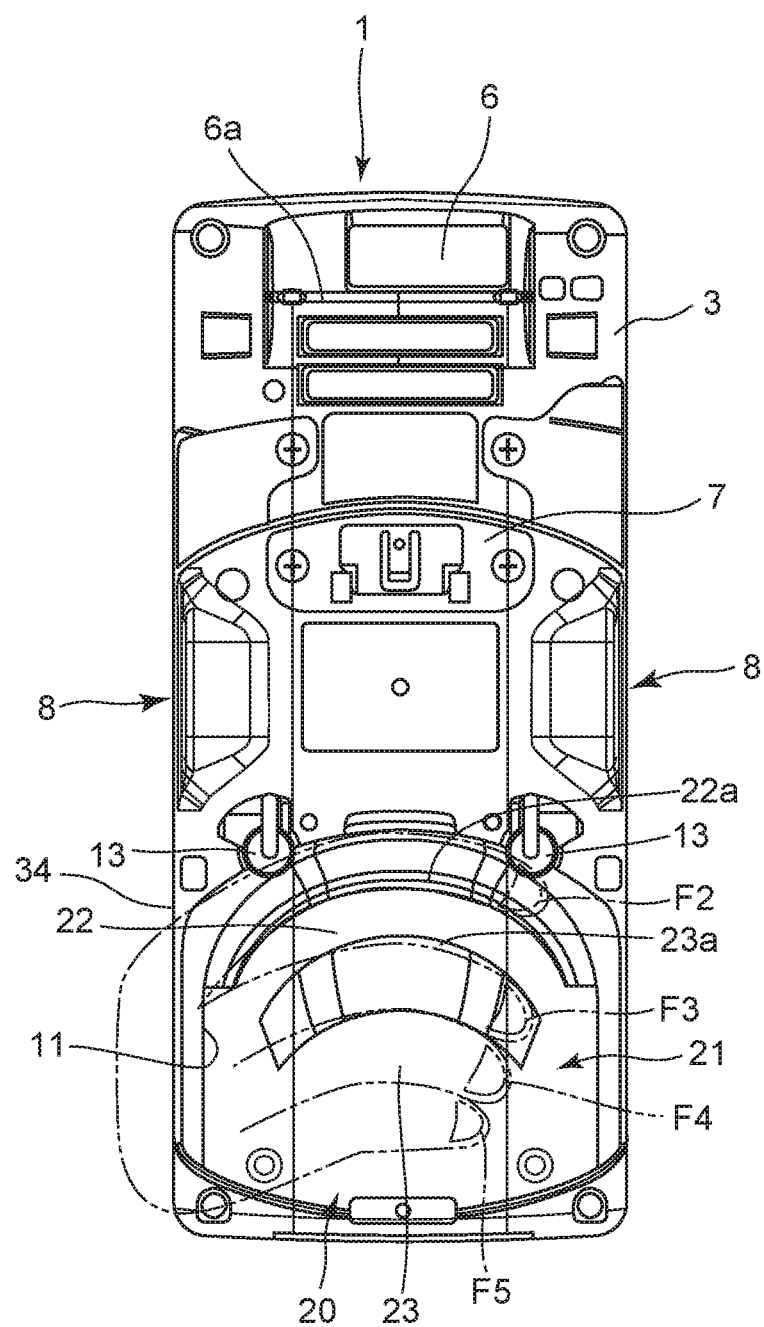
FIG. 9 is a rear view of a second embodiment in which the present invention has been applied in a portable terminal.
Figure 10:
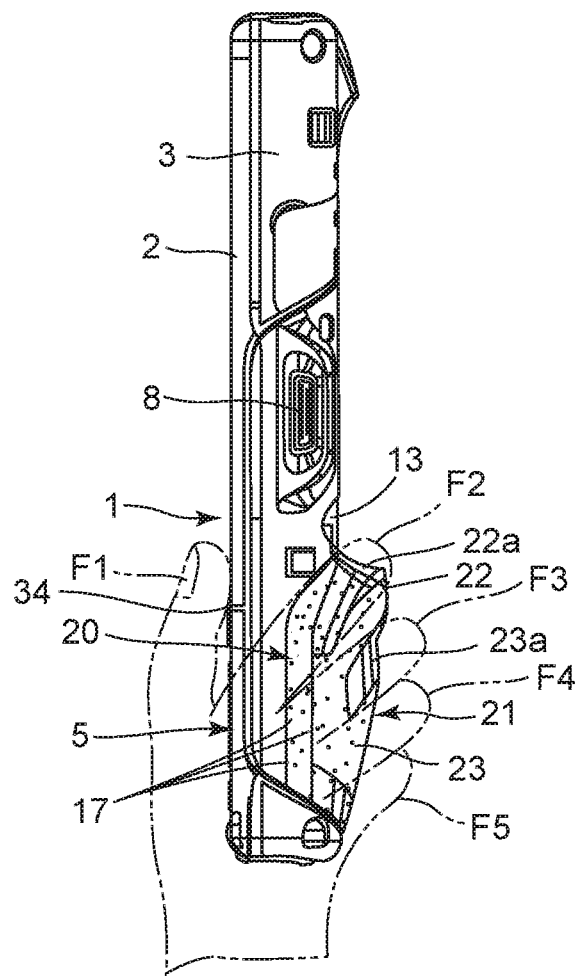
FIG. 10 is a side view of the portable terminal of FIG. 9 when viewed from a left side.
Figure 11:
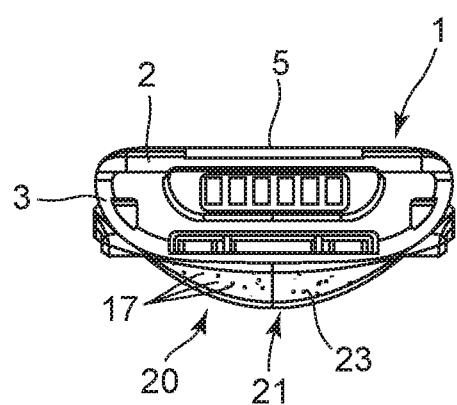
FIG. 11 is a side view of the portable terminal of FIG. 10 when viewed from a lower side.
Figure 12A:
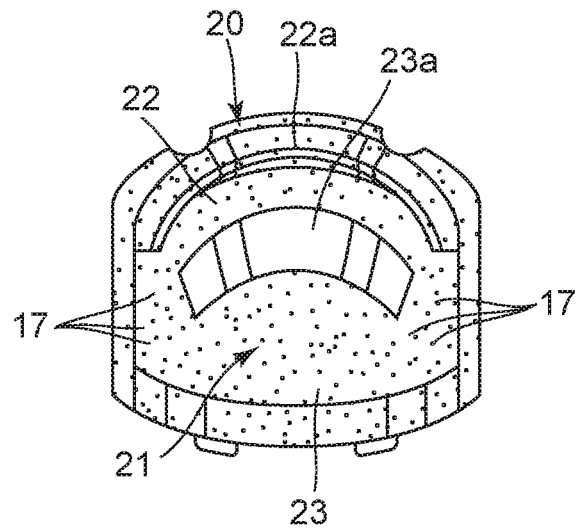
Figure 12B:
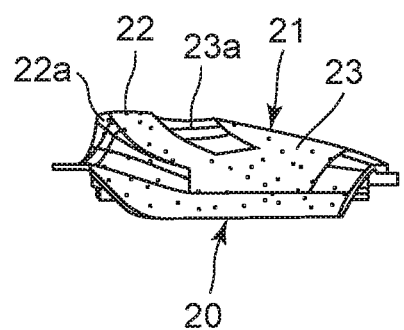
Figure 12C:
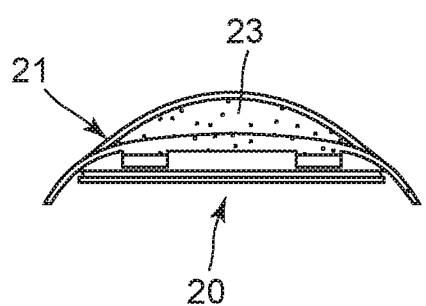
Figure 13:
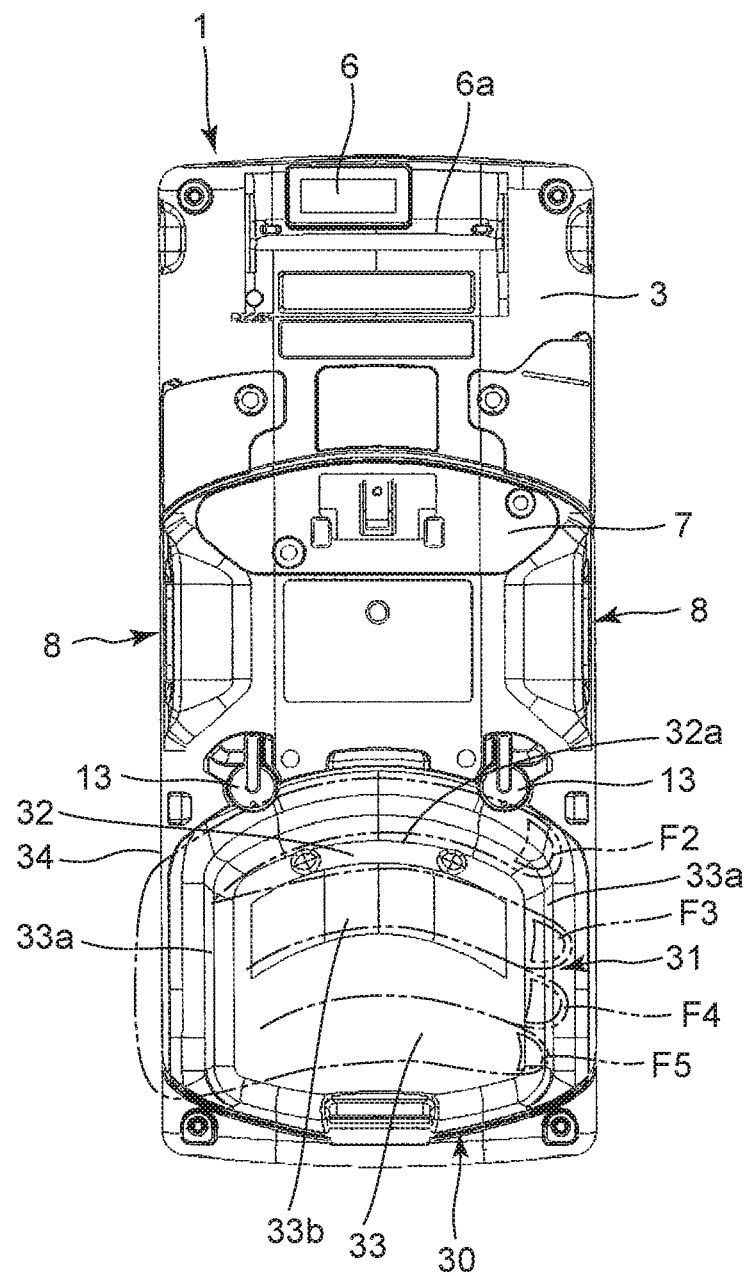
FIG. 13 is a rear view of a third embodiment in which the present invention has been applied in a portable terminal.
Figure 14:
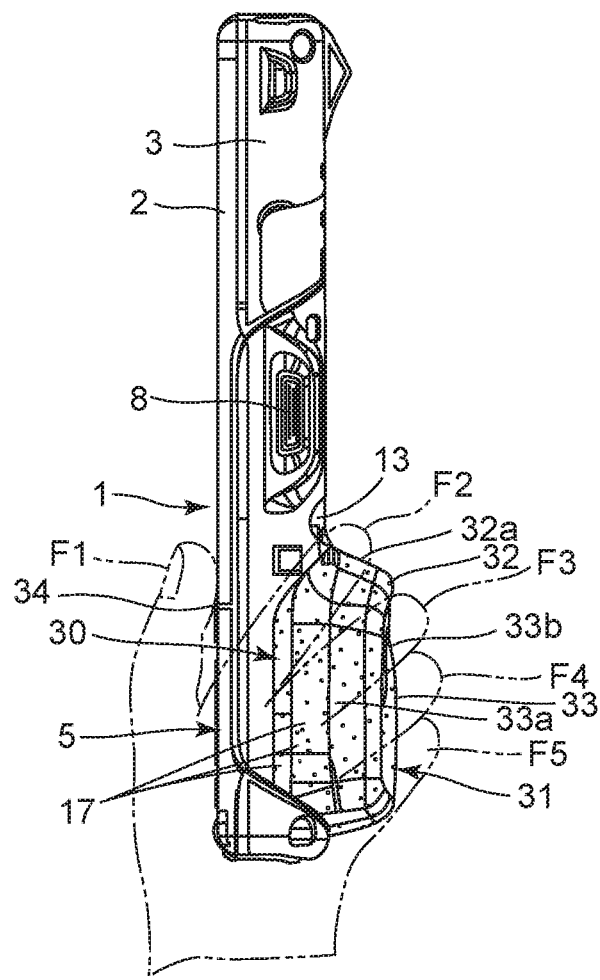
FIG. 14 is a side view of the portable terminal of FIG. 13 when viewed from a left side.
Figure 15:
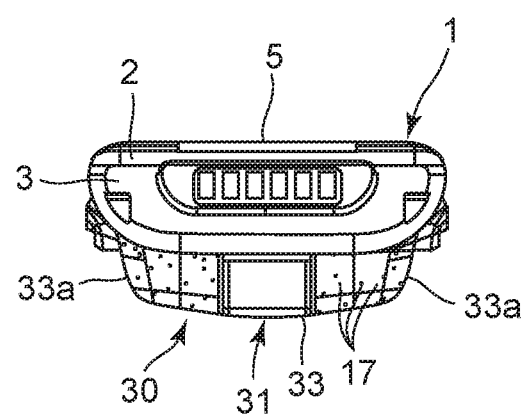
FIG. 15 is a side view of the portable terminal of FIG. 14 when viewed from a lower side.
Figure 16A:
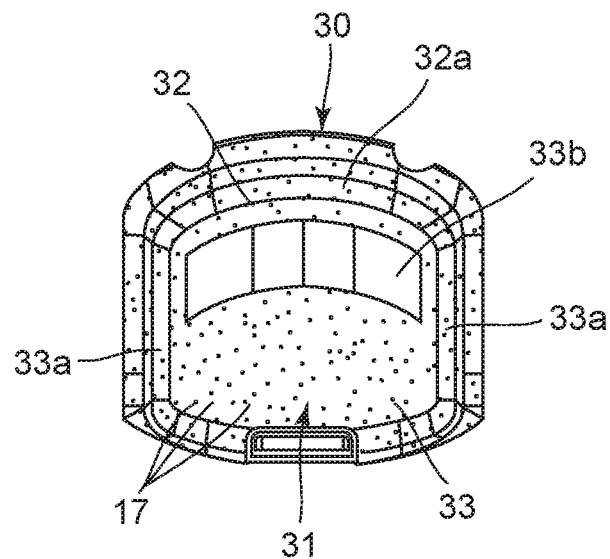
Figure 16B:
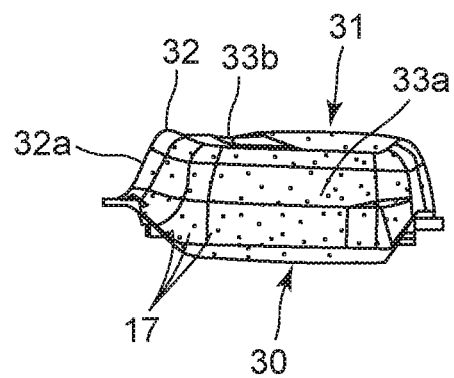
Figure 16C:
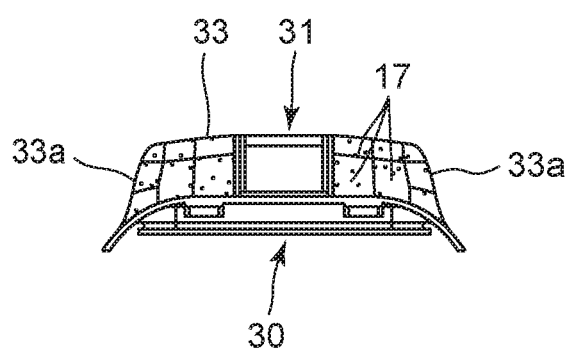

Furthermore, on the lower side of this lower case 3, a battery accommodating section 11 to which a battery cover 10 is removably attached is provided, as shown in FIG. 5 and FIG. 6. This battery accommodating section 11, which is to accommodate a rechargeable battery 12, is provided inside the lower case 3 such that it corresponds to the key operation section 5 provided on the lower side of the upper case 2, and is open to the rear surface side.

In this embodiment, on edge portions of the battery accommodating section 11, a plurality of attachment levers 13 for removably attaching the battery cover 10 to the battery accommodating section 11 are provided, as shown in FIG. 2 and FIG. 6. These attachment levers 13 are structured such that they are rotated to removably engage edge portions of the battery cover 10 with the battery accommodating section 11.

The battery cover 10 is structured to openably cover the battery accommodating section 11 corresponding to the key operation section 5, as shown in FIG. 2 to FIG. 8C. This battery cover 10 is formed in a curved shape in a manner to be slightly curved from both sides of the lower case 3 and project toward the rear surface side, and has a finger-hooking section 14 that is a projecting portion formed at substantially the midpoint of the device case 1 in the lateral direction orthogonal to the longitudinal direction (lengthwise direction) and projects toward the rear surface side of the device case 1.

In this embodiment, the finger-hooking section 14, which is a projecting portion, has a first projection area 15 that extends in the longitudinal direction and a second projection area 16 that is located adjacent to the first projection area 15 while extending toward the lower side in the longitudinal direction and is gradually widened in the lateral direction as it extends toward the lower side in the longitudinal direction, as shown in FIG. 2 to FIG. 5 and FIG. 7A to FIG. 8C. Here, on the surfaces of the finger-hooking section 14 and the battery cover 10, anti-slip portions 17 are provided, which are a number of grooves or asperity. Also, this finger-hooking section 14 is formed to have a shape bilaterally symmetric with respect to its center portion in the lateral direction orthogonal to the longitudinal direction of the device case 1.

The first projection area 15 is formed to have a substantially rectangular shape elongated along the longitudinal direction of the device case 1, and positioned corresponding to a substantially middle portion of the device case 1, as shown in FIG. 2 to FIG. 5 and FIG. 7A to FIG. 8C. Its length in the lateral direction orthogonal to the longitudinal direction of the device case 1 is shorter than the length of the battery cover 10 in the lateral direction, that is, the length of the key operation section 5 in the lateral direction. This first projection area 15 is structured such that its side surfaces on both sides of the device case 1 in the lateral direction serve as finger contact sections 15a provided along the longitudinal direction of the device case 1.

As a result, the first projection area 15 is structured such that, when holding the device case 1 by gripping the device case 1 from the sides of the key operation section 5 by one hand and putting the thumb F1 on the key operation section 5 so as to operate the key operation section 5 with the thumb F1, the user can exert force on the finger contact sections 15a that are the side surfaces of the first projection area 15 by each pulp of the fingers F2 to F5 of the holding hand toward the holding hand side, with the finger tips of the fingers F2 to F5 touching the rear surface of the battery cover 10, as shown in FIG. 1 to FIG. 3.

Here, on an upper side portion of the first projection area 15, a finger-restricting concave section 15b is provided which restricts the position of an index finger F2 of the user when the user holds the device case 1 by gripping the device case 1 from the sides of the key operation section 5 by one hand and putting the thumb F1 on the key operation section 5, as shown in FIG. 2 and FIG. 3.

The second projection area 16 includes finger placing sections 16a which are side surface portions on which the user can put an outer palm edge, that is, a side portion of a small finger F5, as shown in FIG. 1 to FIG. 8C. These finger placing sections 16a are provided tilting toward both sides of the battery cover 10 from an upper portion of the finger-hooking section 14 corresponding to the lower side of the key operation section 5.

As a result, the second projection area 16 is structured such that, when holding the device case 1 by gripping the device case 1 from the sides of the key operation section 5 by one hand and putting the thumb F1 on the key operation section 5 so as to operate the key operation section 5 with the thumb F1, the user puts a side portion of the small finger F5, that is, an outer palm edge on the finger placing section 16a, as shown in FIG. 1 to FIG. 8C.

Next, the mechanism of this portable terminal is described.

To use this portable terminal, the user places the rechargeable battery 12 in the battery accommodating section 11 of the device case 1, and attaches the battery cover 10 to this battery accommodating section 11. In this state, the user grips a portion of the device case 1 where the battery cover 10 is located by one hand. Here, the thumb F1 is placed on the key operation section 5 on the front surface of the device case 1, and the fingers F2 to F5 are hooked on the finger-hooking section 14 of the battery cover 10 provided on the rear surface of the device case 1, whereby a side portion of the device case 1 is pressed onto and placed on the palm.

That is, here, the user holds the device case 1 by gripping the device case 1 from the sides of the key operation section 5 by one hand and putting the thumb F1 on the key operation section 5 so as to operate the key operation section 5 with the thumb F1, with the finger tips of the fingers F2 to F5 of the holding hand touching the rear surface of the battery cover 10. In this state, the user exerts force on the finger contact sections 15a that are the side surfaces of the first projection area 15 by each pulp of the fingers F2 to F5 toward the holding hand side.

When the user grips the device case 1 as described above, the index finger F2 is placed on the finger-restricting concave section 15b provided in the finger-hooking section 14 that is a projection portion. As a result, the index finger F2 is positionally restricted by the finger-restricting concave section 15b, whereby the other fingers F3 to F5 are positionally restricted not to be moved in the longitudinal direction of the finger-hooking section 14. This prevents the hand gripping the device case 1 from slipping in the longitudinal direction of the device case 1, so that the user can favorably hold the device case 1

Also, when griping the device case 1 as described above, if the user holds the device case 1 by gripping the device case 1 from the sides of the key operation section 5 by one hand and putting the thumb F1 on the key operation section 5 so as to operate the key operation section 5 with the thumb F1, a side portion of the small finger F5, that is, an outer palm edge can be placed on the finger placing section 16a of the second projection area 16. This allows the user to stably place the small finger F5 on the finger-hooking section 14 without an uncomfortable feeling and favorably grip the device case 1.

Moreover, since this device case 1 has a curved shape slightly curved from both sides of the lower case 3 so as to project toward the rear surface side, it fits in the user's hand when gripped by one hand. Here, the anti-slip portions 17 which are a number of grooves or asperity provided on the front surfaces of the finger-hooking section 14 and the battery cover 10 prevent the hand from inadvertently slipping on the device case 1, whereby the user can favorably grip the device case 1.

Furthermore, the finger-hooking section 14, which is a projection portion located on substantially the midpoint of the battery cover 10 in the lateral direction orthogonal to the longitudinal direction, is formed such that it is long along the longitudinal direction of the battery cover 10 and shorter than the length of the battery cover 10 in the lateral direction, and the finger contact sections 15a are provided on both sides thereof in the lateral direction of the battery cover 10. As a result of this structure, fingers F2 to F5 other than a thumb F1 can be hooked on one of the finger contact sections 15a on the sides of the finger-hooking section 14, and this finger contact section 15a can be reliably and favorably gripped toward the lateral direction orthogonal to the longitudinal direction, that is, the lateral direction orthogonal to the lengthwise direction of the device case 1.

Since the finger-hooking section 14 is located on substantially the midpoint of the battery cover 10 in the lateral direction orthogonal to the longitudinal direction, and is shorter than the length of the battery cover 10 in the lateral direction, a user with, for example, small hands can grip the device case 1 by gripping this section having the shorter length even though the width of the device case 1 in the lateral direction orthogonal to the longitudinal direction is wide. As a result of this structure, even a user with small hands can reliably and favorably grip the device case 1.

Also, since the finger-hooking section 14 has a shape bilaterally symmetric with respect to its center portion in the lateral direction of the device case 1, the user trying to grip the device case 1 by one hand can reliably and favorably grip the device case 1 with either the right hand or the left hand. When the user grips the device case 1 as described above, the thumb F1 is placed on the key operation section 5 without obstructing the display section 4, so that the user can favorably perform key operations on the key operation section 5 while freely moving the thumb F1 above the key operation section 5 and viewing information displayed on the display section 4.

As described above, the portable terminal includes the device case 1 elongated in the longitudinal direction and having the key operation section 5 provided in a substantially lower area in the longitudinal direction of the front surface that is a first surface. On the rear surface, which is a second surface, on the rear side of the key operation section 5, the finger-hooking section 14 that is a projection portion is provided projecting in the thickness direction of the device case 1. This finger-hooking section 14 has the first projection area 15 that extends in the longitudinal direction and the second projection area 16 that is located adjacent to the first projection area 15 while extending toward the lower side in the longitudinal direction and is gradually widened in the lateral direction as it extends toward the lower side in the longitudinal direction. This allows the user to favorably grip the device case 1 by one hand irrespective of the size of the hand.

That is, in this portable terminal, the first projection area 15 has the finger contact sections 15a as side surfaces that allow the user to exert force on the first projection area 15 toward a holding hand side by each pulp of fingers F2 to F5 of the holding hand with their finger tips touching the rear surface serving as the second surface when the user holds the device case 1 by gripping the device case 1 from the sides of the key operation section 5 by one hand and putting the thumb F1 on the key operation section 5 so as to operate the key operation section 5 with the thumb F1. As a result of this structure, the user can reliably and favorably grip the device case 1 by one hand.

Also, in this portable terminal, the second projection area 16 has the finger placing sections 16a which are side surfaces on which the user can put a side portion of a small finger F5, or in other words, an outer palm edge when the user holds the device case 1 by gripping the device case 1 from the sides of the key operation section 5 by one hand and putting the thumb F1 on the key operation section 5 so as to operate the key operation section 5 with the thumb F1. By this structure where a small finger F5 can be placed on the finger placing section 16a, the user can stably place a small finger F5 on the finger-hooking section 14 without an uncomfortable feeling, and thereby can favorably grip the device case 1.

Moreover, in this portable terminal, a plurality of fingers F2 to F5 excluding a thumb F1 can be hooked on one of the finger contact sections 15a of the finger-hooking section 14 of the battery cover 10, and can reliably and favorably grip the device case 1 toward the direction orthogonal to the longitudinal direction, that is, the lengthwise direction, whereby a side portion of the device case 1 can be reliably pressed onto and placed on a portion of the thumb F1 near its base, and the user can reliably and favorably grip the device case 1 by one hand. In this state, the thumb F1 can be freely moved above the key operation section 5, and thereby can favorably perform key operations.

Furthermore, in this portable terminal, the finger-hooking section 14 has a shape bilaterally symmetric with respect to its center portion in the lateral direction of the device case 1, so that the user can reliably and favorably grip the device case 1 with either the right hand or the left hand, that is, one hand. This structure provides a portable terminal with excellent usability.

Still further, in this portable terminal, the display section 4 is provided in a substantially upper area in the longitudinal direction of the front surface serving as the first surface of the device case 1, so that a thumb F1 can be placed on the key operation section 5 without obstructing the display section 4 when the user holds the device case 1 by gripping the device case 1 from the sides of the key operation section 5 by one hand and putting the thumb F1 on the key operation section 5. As a result of this structure, the user can favorably perform key operations on the key operation section 5 while freely moving a thumb F1 on the key operation section 5 and viewing information displayed on the display section 4.

Yet still further, in this portable terminal, the length of the first projection area 15 in the lateral direction of the device case 1 is shorter than the length of the key operation section 5 in the lateral direction, whereby the user can grip the device case 1 by gripping this section having the shorter length even though the width of the device case 1 in the lateral direction orthogonal to the longitudinal direction is wide. As a result of this structure, even a user with small hands can reliably and favorably grip the device case 1.

Yet still further, in this portable terminal, the finger-hooking section 14 is provided on the battery cover 10 which openably covers the battery accommodating section 11 provided in the device case 1 so as to correspond to the key operation section 5 and be open to the rear surface side. As a result of this structure, the need of providing the finger-hooking section 14 on the device case 1 is eliminated, whereby the shape of the device case 1 can be simplified, and the device case 1 can be easily manufactured. Also, by the structure where the finger-hooking section 14 is provided on the battery cover 10, the finger-hooking section 14 can be easily manufactured together with the battery cover 10.

Yet still further, in this portable terminal, the finger-restricting concave section 15b is provided in the rear surface of the finger-hooking section 14, whereby an index finger F2 can be placed on the finger-restricting concave section 15b of the finger-hooking section 14 when the user grips the device case 1. As a result of this structure, the position of an index finger F2 can be reliably and favorably restricted, and the hand gripping the device case 1 can be prevented from slipping, so that the user can favorably hold the device case 1.

Yet still further, in this portable terminal, the device case 1 has a curved shape slightly curved from both side portions thereof so as to project toward the rear surface side, and therefore fits in the user's hand when gripped by one hand. In addition, the anti-slip portions 17, which are a number of grooves or asperity, are provided on the front surfaces of the finger-hooking section 14 and the battery cover 10. Accordingly, when the device case 1 is gripped, the hand is prevented by the anti-slip portions 17 from inadvertently slipping on the device case 1, so that the device case 1 can be favorably gripped.

In the above-described first embodiment, the second projection area 16 of the finger-hooking section 14 which is a projection portion includes the finger placing sections 16a that are side surfaces where the user can put an outer palm edge, that is, a side portion of a small finger F5. However, the present invention is not limited thereto. For example, a structure may be adopted in which the length of the second projection area 16 in the longitudinal direction is formed shorter and the user holds the device case 1 by putting a side surface of the ring finger F4 thereon.

B. Second Embodiment

Next, a second embodiment where the present invention has been applied in a portable terminal (grip) is described with reference to FIG. 9 to FIG. 12C. Note that sections that are the same as those of the first embodiment shown in FIG. 1 to FIG. 7B are provided with the same reference numerals for description.

This portable terminal has the same structure as that of the first embodiment except that a battery cover 20 removably attached to the battery accommodating section 11 of the device case 1 is different in structure from that of the first embodiment, as shown in FIG. 9 to FIG. 12C. Accordingly, a lower side area occupying one-third of the device case 1 is the grip 34 for the user to hold the portable terminal by one hand.

That is, as with the first embodiment, this battery cover 20 has a finger-hooking section 21 that is a projecting portion formed to have a curved shape slightly curved from both sides of the lower case 3 and project toward the rear surface side, as shown in FIG. 9 to FIG. 12C. As a result of this structure, when the device case 1 is gripped by one hand with the battery cover 20 being attached to the battery accommodating section 11 of the lower case 3, it fits in the hand.

Here, the finger-hooking section 21 has a first projection area 22 projecting more than the read projection section 6a toward the rear surface side of the device case 1 and a second projection area 23 slightly tilted from this first projection area 22 toward the lower side of the battery cover 20, as shown in FIG. 9 to FIG. 12C. On the front surfaces of the finger-hooking section 21 and the battery cover 20, the anti-slip portions 17 which are a number of grooves or asperity are provided, as with the first embodiment.

The first projection area 22 has a finger contact section 22a on which the pulp of the index finger F2 of a holding hand is put toward the lower side of the battery cover 20 in the longitudinal direction so that the user can exert force when the user holds the device case 1 by gripping the device case 1 from the sides of the key operation section 5 by one hand and putting the thumb F1 on the key operation section 5 so as to operate the key operation section 5 with the thumb F1, as shown in FIG. 9 to FIG. 12C.

This finger contact section 22a is a rising surface having a steep slope on the upper side of the first projection area 22 in the longitudinal direction of the battery cover 20, as shown in FIG. 9 to FIG. 12C. Also, this finger contact section 22a is formed to be curved in an arc shape corresponding to a bent index finger F2 along the direction orthogonal to the longitudinal direction (lengthwise direction) of the device case 1.

As a result, the finger-hooking section 21 is structured such that the pulp of a bent index finger F2 is put on the finger contact section 22a along its curve when the user grips the device case 1 by one hand, whereby the device case 1 is subjected to force toward the lower side in the longitudinal direction, as shown in FIG. 9 to FIG. 12C.

The second projection area 23 is formed to have a curved surface which allows the user to exert force toward the holding hand side with each pulp of the other fingers F3 to F5 of the holding hand when the user holds the device case 1 by gripping the device case 1 from the sides of the key operation section 5 by one hand and putting the thumb F1 on the key operation section 5 so as to operate the key operation section 5 with the thumb F1, as shown in FIG. 9 to FIG. 12C.

That is, this second projection area 23 is formed to have a curved surface slightly tilted from its upper side where the finger contact section 22a of the first projection area 22 is positioned toward its lower side, as shown in FIG. 9 to FIG. 12C. Also, this second projection area 23 is provided with a finger-restricting concave section 23a which restricts the position of a middle finger F3.

As a result, the second projection area 23 is structured such that, by the position of a middle finger F3 placed on the finger-restricting concave section 23a being restricted when the user grips the device case 1 by one hand, each pulp of the ring finger F4 and the small finger F5 is favorably and stably placed on the second projection area 23 along the curved surface of the second projection area 23, as shown in FIG. 9 to FIG. 12C.

Next, the mechanism of this portable terminal is described.

To use this portable terminal, the user grips, by one hand, a portion of the device case 1 where the battery cover 20 attached to the battery accommodating section 11 of the device case 1 is located. Here, the user grips the device case 1 by placing the thumb F1 on the key operation section 5 on the front surface of the device case 1, putting the pulp of the index finger F2 on the finger contact section 22a of the first projection area 22 on the finger-hooking section 21 of the battery cover 20 located on the rear surface side of the device case 1, and placing the other fingers F3 to F5 on the second projection area 23 of the finger-hooking section 21.

That is, here, the user holds the device case 1 by gripping the device case 1 from the sides of the key operation section 5 by one hand and putting the thumb F1 on the key operation section 5 so as to operate the key operation section 5 with the thumb F1. In addition, the user puts the pulp of the index finger F2 of the holding hand on the finger contact section 22a of the first projection area 22 on the finger-hooking section 21 of the battery cover 20, and exerts force toward the lower side of the first projection area 22 in the longitudinal direction.

Here, when the user puts the pulp of the index finger F2 on the finger contact section 22a of the first projection area 22 on the finger-hooking section 21 of the battery cover 20 and exerts force toward the lower side of the first projection area 22 in the longitudinal direction, the pulp of the bent index finger F2 is put on the finger contact section 22a along its curve, and whereby the device case 1 is subjected to force toward the lower side in the longitudinal direction.

Also, here, the user holds the device case 1 by gripping the device case 1 from the sides of the key operation section 5 by one hand and putting the thumb F1 on the key operation section 5, and exerts force toward the holding hand side with each pulp of the other fingers F3 to F5 of the holding hand. As a result, each pulp of the fingers F3 to F5 is favorably and stably placed along the curved surface of the second projection area 23, by which the user can reliably and favorably hold the device case 1 by one hand.

When the user grips the device case 1 as described above, the middle finger F3 is placed on the finger-restricting concave section 23a provided in the second projection area 23, and its position is restricted thereby. This causes each pulp of the ring finger F4 and the small finger F5 placed on the second projection area 23 to be positionally restricted in the longitudinal direction of the second projection area 23, and allows the user to favorably hold the device case 1 without the hand gripping the device case 1 slipping in the longitudinal direction of the device case 1.

Also, by having a curved shape slightly curved from both sides of the lower case 3 so as to project toward the rear surface side, the device case 1 fits in a hand when it is gripped by one hand. Here, the anti-slip portions 17 which are a number of grooves or asperity provided on the front surfaces of the finger-hooking section 14 and the battery cover 10 prevent the hand from inadvertently slipping on the device case 1, whereby the user can favorably grip the device case 1.

When the user grips the device case 1 as described above, the thumb F1 is placed on the key operation section 5 without obstructing the display section 4, as with the first embodiment. As a result, the user can favorably perform key operations on the key operation section 5 while freely moving the thumb F1 above the key operation section 5 and viewing information displayed on the display section 4.

As described above, the portable terminal includes the device case 1 elongated in the longitudinal direction and having the key operation section 5 provided in a substantially lower area in the longitudinal direction of the front surface which is the first surface. On the rear surface, which is the second surface, on the rear side of the key operation section 5, the finger-hooking section 21 that is a projection portion is provided projecting in the thickness direction of the device case 1. This finger-hooking section 21 has the first projection area 22 projecting more than the read projection section 6a toward the rear surface side of the device case 1 and the second projection area 23 slightly tilted from the first projection area 22 toward the lower side of the battery cover 20. This allows the user to favorably grip the device case 1 by one hand irrespective of the size of the hand.

That is, in this portable terminal, the first projection area 22 has the finger contact section 22a as a side surface that allows the user to exert force by pressing it with the pulp of the index finger F2 of a holding hand toward the lower side of the battery cover 20 in the longitudinal direction when the user holds the device case 1 by gripping the device case 1 from the sides of the key operation section 5 by one hand and putting the thumb F1 on the key operation section 5 so as to operate the key operation section 5 with the thumb F1. As a result of this structure, the user can reliably and favorably grip the device case 1 by one hand.

Also, in this portable terminal, the second projection area 23 has a curved surface that allows the user to exert force by each pulp of fingers F3 to F5 of a holding hand toward the holding hand side when the user holds the device case 1 by gripping the device case 1 from the sides of the key operation section 5 by one hand and putting the thumb F1 on the key operation section 5 so as to operate the key operation section 5 with the thumb F1. This allows the fingers F3 to F5 excluding the thumb F1 and the index finger F2 to be stably placed on the second projection area 23 without an uncomfortable feeling, and also allows the device case 1 to be favorably gripped.

Accordingly, in this portable terminal, by a plurality of fingers F2 to F5 excluding a thumb F1 being put on the finger-hooking section 21 of the battery cover 20 so as to grip the device case 1, a side portion of the device case 1 can be reliably pressed onto and placed on a portion of the thumb F1 near its base, and the user can reliably and favorably grip the device case by one hand. In this state, the thumb F1 can be freely moved above the key operation section 5, and thereby can favorably perform key operations.

In this embodiment, the finger-hooking section 21 is provided on the battery cover 20 which openably covers the battery accommodating section 11 provided in the device case 1 corresponding to the key operation section 5. As a result of this structure, the need of providing the finger-hooking section 21 on the device case 1 is eliminated, whereby the shape of the device case 1 can be simplified, and the device case 1 can be easily manufactured, as with the first embodiment. Also, by the structure where the finger-hooking section 21 is provided on the battery cover 20, the finger-hooking section 21 can be easily manufactured together with the battery cover 20.

Also, in the first projection area 22 of the finger-hooking section 21, the finger contact section 22a which is a rising surface is formed to be curved in an arc shape corresponding to a bending index finger F2 along the direction orthogonal to the longitudinal direction (lengthwise direction) of the device case 1. Accordingly, when holding the device case 1 by gripping the device case 1 from the sides of the key operation section 5 by one hand and putting the thumb F1 on the key operation section 5, the user can place the bent index finger F2 of the holding hand on the finger contact section 22a along its curve. As a result of this structure, the user can favorably hook the index finger F2 on the finger contact section 22a and reliably exert force toward the lower side of the device case 1 in the longitudinal direction.

In this embodiment, the second projection area 23 of the finger-hooking section 21 is provided with the finger-restricting concave section 23a which restricts the position of a middle finger F3. This allows a middle finger F3 to be placed on the finger-restricting concave section 23a with its position being restricted, when the device case 1 is gripped by one hand. Accordingly, the ring finger F4 and the small finger F5 can be stably placed on the second projection area 23, whereby the user can favorably hold the device case 1 without the hand gripping the device case 1 slipping in the longitudinal direction of the device case 1.

In this case as well, the anti-slip portions 17, which are a number of grooves or asperity, are provided on the front surfaces of the finger-hooking section 21 and the battery cover 20, as with the first embodiment. Accordingly, when the device case 1 is gripped, the hand is prevented by the anti-slip portions 17 from inadvertently slipping on the device case 1, so that the device case 1 can be favorably gripped.

Also, in this portable terminal, the display section 4 is provided in a substantially upper area in the longitudinal direction of the front surface which is the first surface of the device case 1, as with the first embodiment. Accordingly, when the user holds the device case 1 by gripping the device case 1 from the sides of the key operation section 5 by one hand and putting the thumb F1 on the key operation section 5, the thumb F1 is placed on the key operation section 5 without obstructing the display section 4, so that the user can favorably perform key operations on the key operation section 5 while freely moving the thumb F1 above the key operation section 5 and viewing information displayed on the display section 4.

C. Third Embodiment

Next, a third embodiment where the present invention has been applied in a portable terminal (grip) is described with reference to FIG. 13 to FIG. 16C. Note that, in this case as well, sections that are the same as those of the first embodiment shown in FIG. 1 to FIG. 7B are provided with the same reference numerals for description.

This portable terminal has the same structure as that of the first embodiment except that a battery cover 30 removably attached to the battery accommodating section 11 of the device case 1 is different in structure from that of the first embodiment, as shown in FIG. 13 to FIG. 16C. Accordingly, a lower side area occupying one-third of the device case 1 is the grip 34 for the user to hold the portable terminal 1 by one hand.

That is, on this battery cover 30, a finger-hooking section 31 is formed which has a substantially box shape projecting toward the rear surface side of the device case 1, as shown in FIG. 13 to FIG. 16C. This finger-hooking section 31 extends substantially vertically from areas near both sides of the lower case 3 toward the rear surface side when the battery cover 30 is attached to the battery accommodating section 11 of the device case 1. This extended portion, which projects more than the read projection section 6a of the lower case 3, has a substantially flat shape. As a result, the finger-hooking section 31 has a substantially box shape in its entirety, or in other words, a substantially rectangular parallelepiped shape.

As a result, the battery cover 30 is structured such that the accommodation capacity of the battery accommodating section 11 when the battery cover 30 is attached to the battery accommodating section 11 of the device case 1 is significantly larger than that of the battery cover 20 of the second embodiment, as shown in FIG. 13 to FIG. 16C. Accordingly, the battery accommodating section 11 to which the battery cover 30 is attached is structured such that the large-capacity rechargeable battery 12 is accommodated therein.

In this case as well, the battery cover 30 is formed to have a curved shape slightly curved from both sides of the lower case 3 so as to project toward the rear surface side, as shown in FIG. 13 to FIG. 16C. As a result of this structure, when the device case 1 is gripped by one hand with the battery cover 30 being attached to the battery accommodating section 11 of the lower case 3, it easily fits in the hand.

This finger-hooking section 31 has a first projection area 32 projecting more than the read projection section 6a toward the rear surface side of the device case 1 and located on the upper side of the battery cover 30 and a second projection area 33 projecting more than the read projection section 6a toward the rear surface side thereof and located on the lower side of the battery cover 30, as shown in FIG. 13 to FIG. 16C.

The first projection area 32 has a first finger contact section 32a as a side surface on which the pulp of the index finger F2 of a holding hand is put toward the lower side of the battery cover 30 in the longitudinal direction so that the user can exert force when the user holds the device case 1 by gripping the device case 1 from the sides of the key operation section 5 by one hand and putting the thumb F1 on the key operation section 5 so as to operate the key operation section 5 with the thumb F1, as shown in FIG. 13 to FIG. 16C.

This first finger contact section 32a is a rising surface having a steep slope on the upper side of the first projection area 32 in the longitudinal direction of the battery cover 30, as shown in FIG. 13 to FIG. 16C. Also, this finger contact section 32a is formed to be curved in an arc shape corresponding to a bent index finger F2 along the direction orthogonal to the longitudinal direction (lengthwise direction) of the device case 1.

As a result, the first projection area 32 is structured such that the pulp of a bent index finger F2 is put on the first finger contact section 32a along its curve when the user grips the device case 1 by one hand, whereby the device case 1 is subjected to force toward the lower side in the longitudinal direction, as shown in FIG. 13 to FIG. 16C.

The second projection area 33 is formed to have second finger contact sections 33a as side surfaces that allow the user to exert force on the second projection area 33 toward a holding hand side by each pulp of fingers F3 to F5 of the holding hand with their finger tips touching the rear surface of the battery cover 30 when the user holds the device case 1 by gripping the device case 1 from the sides of the key operation section 5 by one hand and putting the thumb F1 on the key operation section 5 so as to operate the key operation section 5 with the thumb F1, as shown in FIG. 13 to FIG. 16C.

These second finger contact sections 33a are rising surfaces having steep slopes and located on the left and right sides of the second projection area 33 in the lateral direction orthogonal to the longitudinal direction of the battery cover 30, as shown in FIG. 13 to FIG. 16C. Also, the second projection area 33 is provided with a finger-restricting concave section 33b which restricts the position of a middle finger F3. As a result, the second projection area 33 is structured such that, by the position of a middle finger F3 placed on the finger-restricting concave section 33b being restricted when the device case 1 is gripped by one hand, the ring finger F4 and the small finger F5 are stably placed on the second projection area 33.

Moreover, on the front surfaces of the finger-hooking section 31 and the battery cover 30, the anti-slip portions 17 which are a number of grooves or asperity are provided as with the first embodiment, as shown in FIG. 14 to FIG. 16C. As a result of this structure, the finger-hooking section 31 and the battery cover 30 are structured such that a hand gripping this portion of the device case 1 is prevented from inadvertently slipping on the device case 1.

Next, the mechanism of this portable terminal is described.

To use this portable terminal, the user grips, by one hand, a portion of the device case 1 where the battery cover 30 attached to the battery accommodating section 11 of the device case 1 is located. Here, the user grips the device case 1 by placing the thumb F1 on the key operation section 5 on the front surface of the device case 1, putting the index finger F2 on the first finger contact section 32a of the first projection area 32 located on the upper side of the finger-hooking section 31 of the battery cover 30 on the rear surface side of the device case 1, and hooking the other fingers F3 to F5 on the second finger contact sections 33a on the left and right sides of the second projection area 33 located on the lower side of the finger-hooking section 31 of the battery cover 30.

That is, here, the user holds the device case 1 by gripping the device case 1 from the sides of the key operation section 5 by one hand and putting the thumb F1 on the key operation section 5 so as to operate the key operation section 5 with the thumb F1. In addition, the user puts the pulp of the index finger F2 of the holding hand on the first finger contact section 32a of the first projection area 32 on the finger-hooking section 31 of the battery cover 30, and exerts force toward the lower side of the first projection area 32 in the longitudinal direction.

Here, when the user puts the pulp of the index finger F2 on the first finger contact section 32a of the first projection area 32 on the finger-hooking section 31 of the battery cover 30 and exerts force toward the lower side of the first projection area 32 in the longitudinal direction, the pulp of the bent index finger F2 is put on the first finger contact section 32a along its curve, and whereby the device case 1 is subjected to force toward the lower side in the longitudinal direction.

Also, here, the user holds the device case 1 by gripping the device case 1 from the sides of the key operation section 5 by one hand and putting the thumb F1 on the key operation section 5, and exerts force on the second finger contact sections 33a of the second projection area 33 toward the holding hand side by each pulp of the other fingers F3 to F5 of the holding hand with their finger tips touching the rear surface of the battery cover 30.

When the user grips the device case 1 as described above, the middle finger F3 is placed on the finger-restricting concave section 33b provided in the second projection area 33 and its position is restricted thereby. This causes each pulp of the ring finger F4 and the small finger F5 placed on the second projection area 33 to be positionally restricted in the longitudinal direction of the second projection area 33, and allows the user to favorably hold the device case 1 without the hand gripping the device case 1 slipping in the longitudinal direction of the device case 1.

Also, by having a curved shape slightly curved from both sides of the lower case 3 so as to project toward the rear surface side, the device case 1 fits in a hand when it is gripped by one hand. Here, when the user grips the device case 1, the anti-slip portion 17 which are a number of grooves or asperity provided on the front surfaces of the finger-hooking section 31 and the battery cover 30 prevent the hand from inadvertently slipping on the device case 1, whereby the user can favorably grip the device case 1.

When the user grips the device case 1 as described above, the thumb F1 is placed on the key operation section 5 without obstructing the display section 4, as with the first embodiment. As a result, the user can favorably perform key operations on the key operation section 5 while freely moving the thumb F1 above the key operation section 5 and viewing information displayed on the display section 4.

As described above, the portable terminal includes the device case 1 elongated in the longitudinal direction and having the key operation section 5 provided in a substantially lower area in the longitudinal direction of the front surface which is the first surface. On the rear surface, which is the second surface, on the rear side of the key operation section 5, the finger-hooking section 31 that is a projection portion is provided projecting in the thickness direction of the device case 1. This finger-hooking section 31 has the first projection area 32 projecting on the upper side of the battery cover 30 toward the rear surface side and the second projection area 33 projecting on the lower side of the battery cover 30 toward the rear surface side. This allows the user to favorably grip the device case 1 by one hand.

That is, in this portable terminal, the first projection area 32 has the first finger contact section 32a as a side surface that allows the user to exert force by pressing it with the pulp of the index finger F2 of a holding hand toward the lower side of the battery cover 30 in the longitudinal direction when the user holds the device case 1 by gripping the device case 1 from the sides of the key operation section 5 by one hand and putting the thumb F1 on the key operation section 5 so as to operate the key operation section 5 with the thumb F1. As a result of this structure, the user can reliably and favorably grip the device case 1 by one hand.

Also, in this portable terminal, the second projection area 33 has the second finger contact sections 33a as side surfaces that allow the user to exert force on the second projection area 33 toward a holding hand side by each pulp of fingers F3 to F5 of the holding hand with their finger tips touching the rear surface of the battery cover 30 when the user holds the device case 1 by gripping the device case 1 from the sides of the key operation section 5 by one hand and putting the thumb F1 on the key operation section 5 so as to operate the key operation section 5 with the thumb F1, as shown in FIG. 9 to FIG. 12C. As a result of this structure, the user can reliably and favorably grip the device case 1 by one hand.

In this embodiment, the finger-hooking section 31 is provided on the battery cover 30 which openably covers the battery accommodating section 11 provided in the device case 1 corresponding to the key operation section 5. As a result of this structure, the need of providing the finger-hooking section 31 on the device case 1 is eliminated, whereby the shape of the device case 1 can be simplified, and the device case 1 can be easily manufactured, as with the first embodiment. Also, by the structure where the finger-hooking section 31 is provided on the battery cover 30, the finger-hooking section 31 can be easily manufactured together with the battery cover 30.

Also, on the upper side of the first projection area 32, the first finger contact section 32a is formed to be curved in an arc shape corresponding to a bent index finger F2, in the direction orthogonal to the longitudinal direction (lengthwise direction) of the device case 1. Accordingly, a bent index finger F2 can be placed on the first finger contact section 32a along its curve when the user holds the device case 1 by one hand with the thumb F1 being placed on the key operation section 5. As a result of this structure, the user can reliably and favorably exert force toward the device case 1 in the longitudinal direction.

Moreover, in the second projection area 33, the finger-restricting concave section 33b is provided which restricts the position of a middle finger F3. This allows a middle finger F3 to be placed on the finger-restricting concave section 33b with its position being restricted, when the device case 1 is gripped by one hand. Accordingly, the ring finger F4 and the small finger F5 can be stably placed on the second projection area 33, whereby the user can favorably hold the device case 1 without the hand gripping the device case 1 slipping in the longitudinal direction of the device case 1, as with the second embodiment.

Accordingly, in this portable terminal, a side portion of the device case 1 can be reliably pressed onto and placed on a portion of a thumb F1 near its base, so that the user can reliably and favorably grip the device case 1 by one hand. As a result, the thumb F1 can be freely moved above the key operation section 5, and thereby can favorably perform key operations.

In this case as well, the anti-slip portions 17, which are a number of grooves or asperity, are provided on the front surfaces of the finger-hooking section 31 and the battery cover 30, as with the first embodiment. Accordingly, when the device case 1 is gripped, the hand is prevented by the anti-slip portions 17 from inadvertently slipping on the device case 1, so that the device case 1 can be favorably gripped.

Also, in this portable terminal, the display section 4 is provided in a substantially upper area in the longitudinal direction of the front surface which is the first surface of the device case 1, as with the first embodiment. Accordingly, when the user holds the device case 1 by gripping the device case 1 from the sides of the key operation section 5 by one hand and putting the thumb F1 on the key operation section 5, the thumb F1 is placed on the key operation section 5 without obstructing the display section 4, so that the user can favorably perform key operations on the key operation section 5 while freely moving the thumb F1 above the key operation section 5 and viewing information displayed on the display section 4.

In each of the above-described first to third embodiments, the key operation section 5 is provided on the upper surface of the device case 1. However, the present invention is not limited thereto. For example, the operation section may be an input display section where a transparent touch panel and a display panel have been laminated.

While the present invention has been described with reference to the preferred embodiments, it is intended that the invention be not limited by any of the details of the description therein but includes all the embodiments which fall within the scope of the appended claims.

What is claimed is:

1. A portable terminal comprising:
an operation section which is provided in a substantially lower area in a longitudinal direction of a first surface of the portable terminal;
a flat area which is provided in a midpoint in the longitudinal direction of a second surface serving as a rear surface of the first surface;
a first projection section which is provided on a substantially upper area in the longitudinal direction of the second surface and projects from the flat area in a thickness direction of the portable terminal to store a scanner section; and
a second projection section as a grip which is provided in a substantially lower area in the longitudinal direction of the second surface and projects from the flat area in the thickness direction,
wherein the second projection section has a first projection area that extends in the longitudinal direction and a second projection area that is located adjacent to the first projection area while extending toward a lower side in the longitudinal direction and is gradually widened in a lateral direction as extending toward the lower side in the longitudinal direction, wherein the first projection area is formed to have a substantially rectangular shape in which the longitudinal direction is taken as a lengthwise direction, and wherein the second projection area is formed such that a degree of projection in the thickness direction gradually becomes smaller from a center line in the lateral direction of the portable terminal toward an end portion.

2. The portable terminal according to claim 1, wherein the second projection section more greatly projects in the thickness direction than the first projection section.

3. The portable terminal according to claim 1, wherein, in the first projection area, a finger-restricting concave section for restricting a position of a finger of the user with which the portable terminal is operated to a predetermined position is provided so as to extend in the lateral direction.

4. The portable terminal according to claim 1, wherein the finger-restricting concave section is provided in a substantially upper area in a longitudinal direction of a bottom surface of the first projection area.

5. The portable terminal according to claim 1, wherein the projection section is provided on a battery cover openably and closably attached to a battery accommodating section provided in the portable terminal in a manner to correspond to the operation section and to be open to the second surface.

6. The portable terminal according to claim 1, wherein the flat area is provided with a connection terminal for connecting to an external device.

* * * * *